(No Model.) 5 Sheets—Sheet 1.

B. GAUSE.
COTTON HARVESTER.

No. 520,045. Patented May 22, 1894.

Witnesses
Percy C. Bowen
John A. Wilson

Inventor
Benjamin Gause
By Whitman & Wilkinson
Attorneys (No Model.) 5 Sheets—Sheet 4.

B. GAUSE.
COTTON HARVESTER.

No. 520,045. Patented May 22, 1894.

Witnesses
Percy C. Bowen
John A. Wilson

Inventor
Benjamin Gause,
By Whitman & Wilkinson
Attorneys.

(No Model.) 5 Sheets—Sheet 5.
B. GAUSE.
COTTON HARVESTER.
No. 520,045. Patented May 22, 1894.
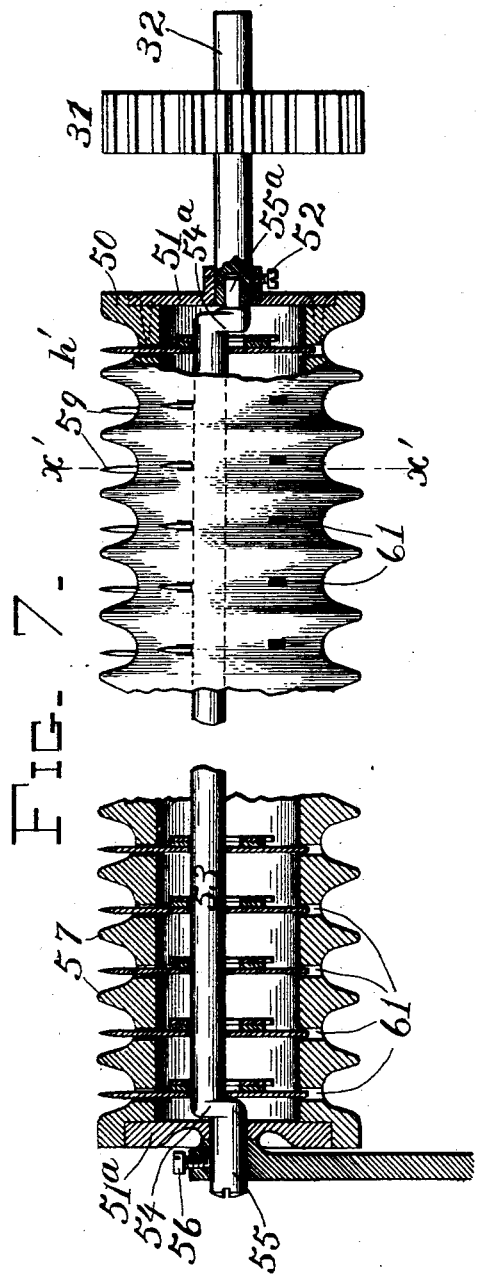
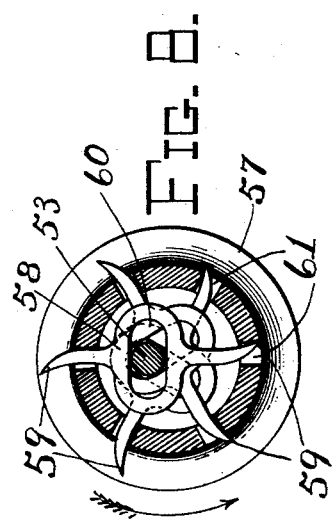
Witnesses
Percy C Bowen
John A. Wilson
Inventor
Benjamin Gause
By Whitman & Wilkinson,
Attorneys.

UNITED STATES PATENT OFFICE.

BENJAMIN GAUSE, OF ATLANTA, GEORGIA, ASSIGNOR TO JOHN C. CALHOUN, OF NEW YORK, N. Y.

COTTON-HARVESTER.

SPECIFICATION forming part of Letters Patent No. 520,045, dated May 22, 1894.

Application filed August 2, 1893. Serial No. 482,175. (No model.)

*To all whom it may concern:*

Be it known that I, BENJAMIN GAUSE, a citizen of the United States, residing at Atlanta, in the county of Fulton and State of Georgia, have invented certain new and useful Improvements in Cotton-Harvesters; and I do hereby declare the following to be a full, clear, and exact description of the invention, such as will enable others skilled in the art to which it appertains to make and use the same.

My invention relates to improvements in cotton harvesters, and it consists of certain novel features shown but not claimed in my Patent No. 503,041, granted August 8, 1893, and hereinafter described and claimed.

Reference is had to the accompanying drawings, in which the same or corresponding parts are indicated by the same letters and numerals throughout the several views.

Figure 1:
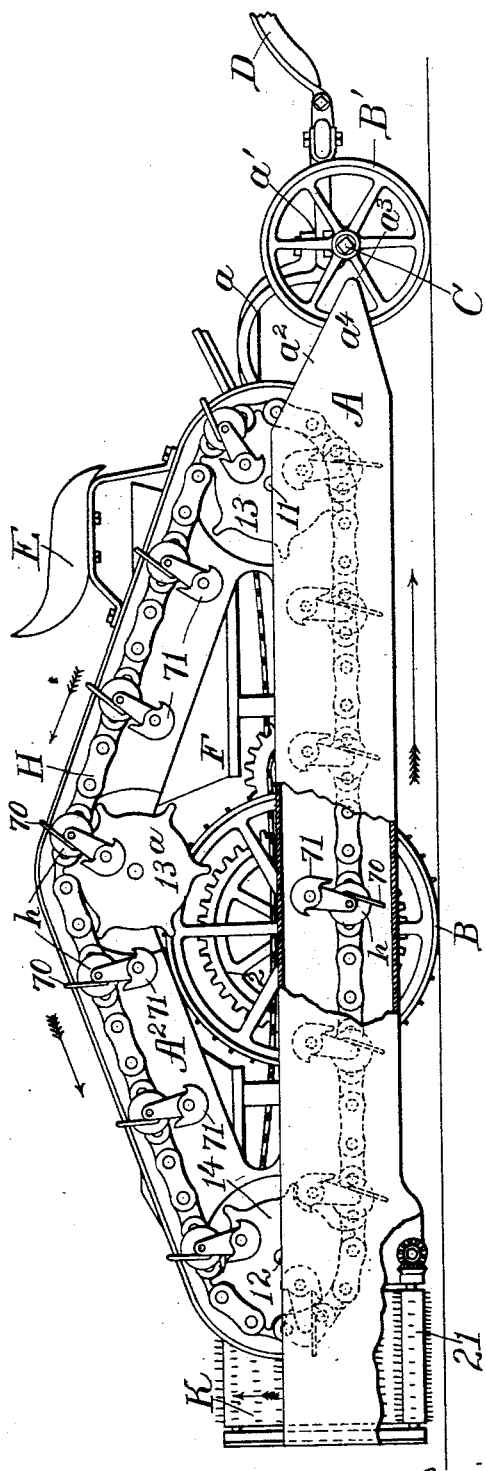
Figure 2:
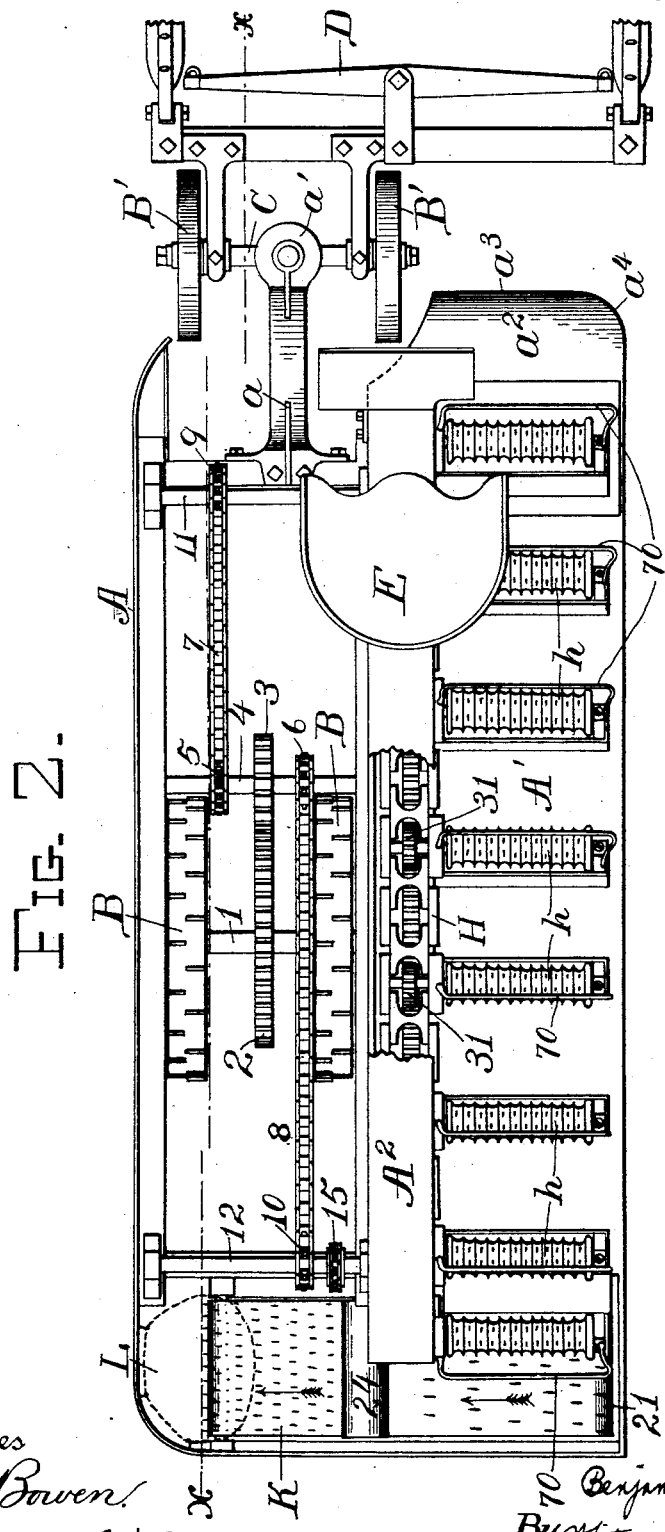
Figure 3:
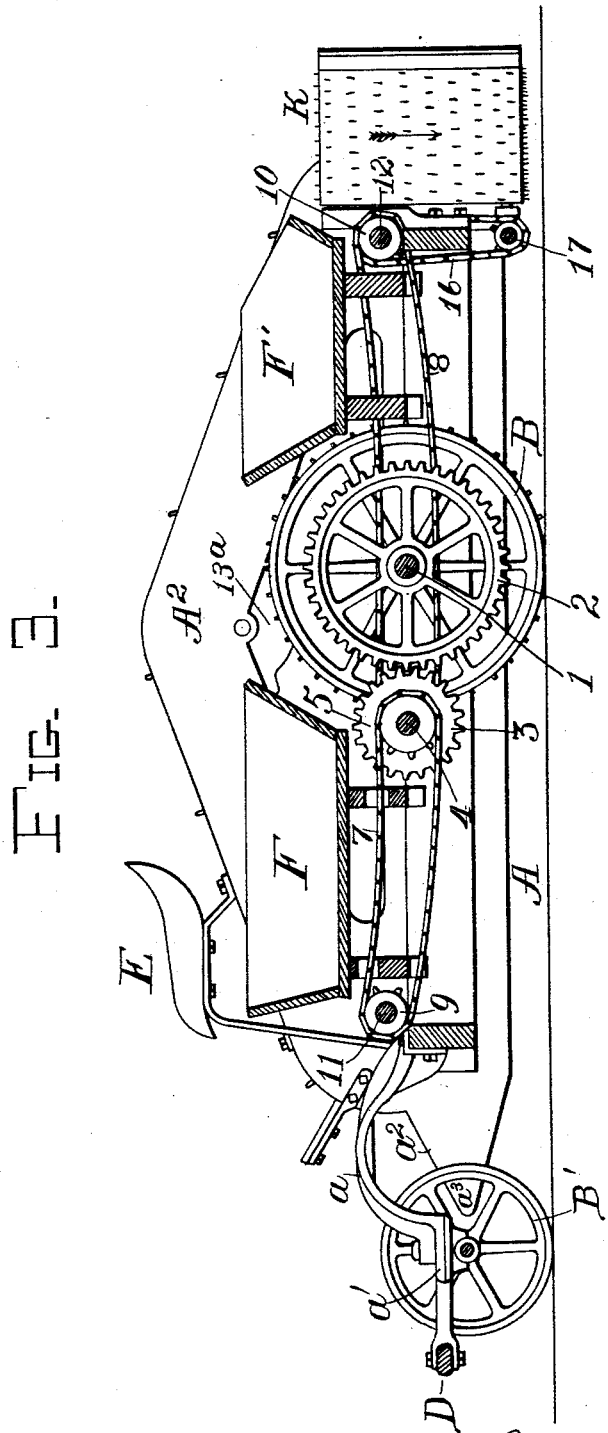
Figure 4:
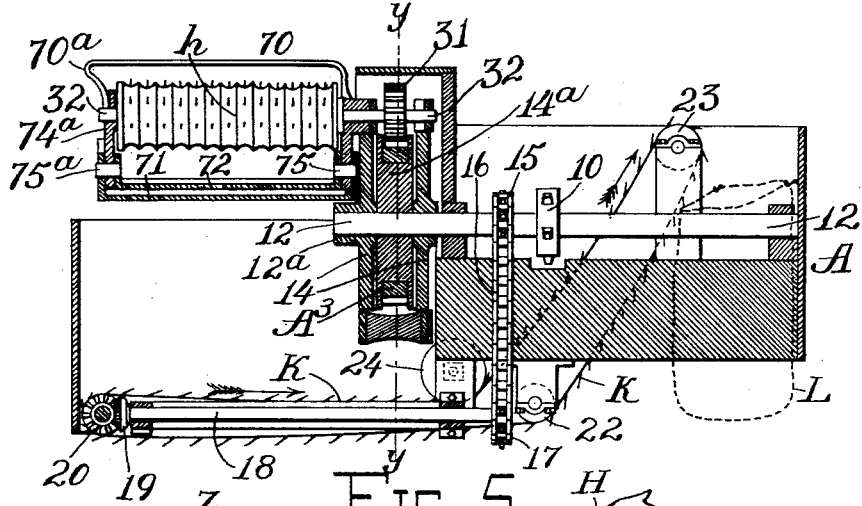
Figure 5:
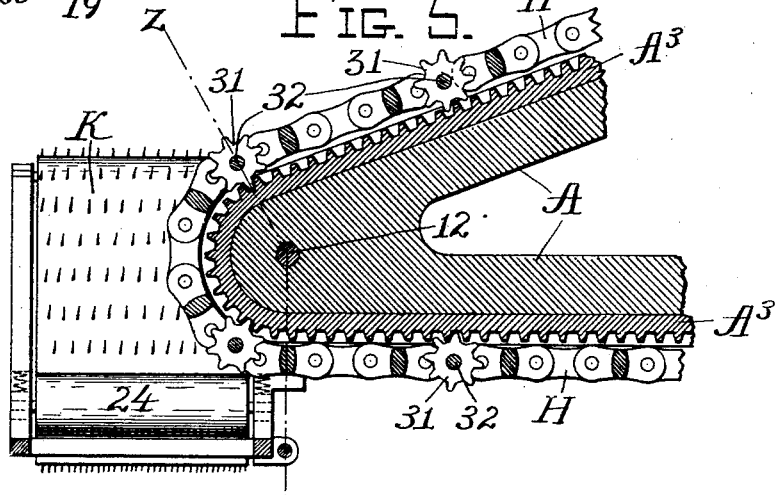
Figure 6:
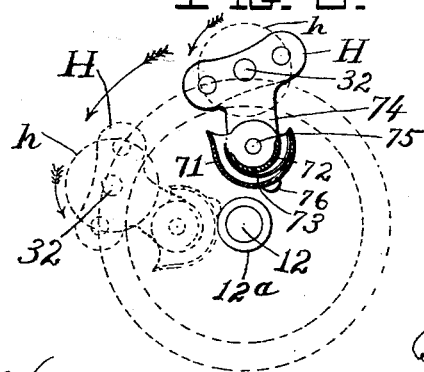

Figure 1 represents a side view of a cotton harvester, parts being broken away. Fig. 2 represents a plan view of the same, parts being broken away. Fig. 3 represents a vertical section along the line $x\ x$ of Fig. 2, looking in the direction of the arrows. Fig. 4 represents a section along the line $z\ z$ of Fig. 5, looking to the left. Fig. 5 represents a section along the line $y\ y$ of Fig. 4, looking to the left. Fig. 6 represents a diagrammatic view of the detached picker stem, and illustrates the method of discharging the cotton from the same. Fig. 7 represents a sectional elevation of a picker stem adapted for use in my improved cotton harvester. Fig. 8 represents a transverse section of the picker stem shown in Fig. 7, and along the line $x'\ x'$ of the said figure.

A represents a frame work mounted on traction wheels B just in rear of the center of gravity of the machine, and ordinary wheels B' mounted on the axle C, to which the draft gear is attached.

In order that the machine may be turned readily, the frame $a$ terminates at its forward end in a curved beam $a$ high enough to allow the wheels B' to go under, and a fifth wheel $a'$ similar to those commonly in use. The frame work A has on its lower right-hand side a box A' through which the picker stems travel in their forward movement, and by which they are kept clear of the ground. This box A' has apertures at each end for the admission and exit of the sprocket chain, and the picker stems carried thereby, and its forward end has a nose $a^3$ rounded at $a^4$ and sloping upward at $a^2$ for deflecting the low lying branches of the cotton stalks. The sprocket chain, and mechanism for turning the picker stems, travel in a box $A^2$ attached to the upper part of the frame A.

E represents a seat for the driver.

F and F' represent boxes mounted on the machine for the empty sacks or for carrying a full sack or two if desired. These boxes are omitted from Fig. 2 for the better illustration of the mechanism beneath them.

H represents the sprocket chain to which the picker stems $h$ are revolubly attached, the said sprocket chain being driven by suitable sprocket wheels, and traveling in the direction of the arrows. In order that the picker stems may rise and fall in each cotton bush without any longitudinal movement over the ground, this sprocket chain may be so arranged that it will travel backward with the same speed with which the machine goes forward, which will cause the picker stem to have a vertical movement relative to the ground without any horizontal movement. Or, should a small horizontal movement be desired at any time, the sprocket chain may readily be geared so as to accomplish this result.

K represents a carrier for carrying off the cotton dumped from the picker stems, and L represents a bag or other receptacle suspended beneath the end of this carrier in any convenient way.

To enter more into the details of the machine, the traction wheels B are keyed on the shaft I journaled in the frame, and on this same shaft the cog wheel 2 is mounted. This cog wheel gears into the pinion 3 mounted on the shaft 4, which shaft also carries the sprocket wheels 5 and 6 driving the chains 7 and 8, and sprocket wheels 9 and 10, respectively. The sprocket wheel 9 turns the shaft 11, and sprocket wheel 13, which latter drives the forward loop of the sprocket chain H carrying the picker stems $h$. The sprocket chain 8 turns the sprocket wheel 10, shaft 12, and sprocket wheels 14 and 15. The sprocket wheel 14 drives the rear loop of the sprocket chain H carrying the picker stems. The object of having two sprocket wheels 13 and 14 to drive the one chain H is to lessen the binding effect of the said chain, and to distribute the strain on the sprocket chain H on two bearing centers.

$13^a$ is an idler sprocket wheel to raise the links slightly as they pass over the apex of the machine. The sprocket wheel 15 drives the sprocket chain 16, sprocket wheel 17, shaft 18, and miter wheels 19 and 20, by which motion is given to the drum 21 which drives the apron K. This apron is preferably provided with projecting spikes or tacks as shown, and passes under the idlers 22 and 24, and over the idler 23, in the direction indicated by the arrow in Fig. 4.

The sprocket wheel 14 consists of two side disks held apart by a suitable block $14^a$. Between these disks the pinions 31 mounted on a shaft 32, carrying the picker stems pass freely. These pinions engage in a fixed rack $A^3$ on the frame work A; and, as the sprocket chain H travels along, the picker stems are not only carried along bodily but are given a rotary motion about their axes 32.

In the picker stem shown in Figs. 7 and 8, a hollow cylinder 50 is secured to the heads 51 and $51^a$ and is revolved by the shaft 32 clamped to the head 51 by the clamp screw 52. The long crank pin 53 runs through the cylinder 50, and has its inner end joined to a crank $54^a$ which is journaled at $55^a$ in the center of the shaft 32. The outer end of the said crank pin is joined by the crank 54 to the fixed shaft 55, which is set at the desired position by the clamp screw 56. This hollow cylinder is corrugated as at 57, and has teeth 59 on opposite sides of the yoke piece 58. This yoke piece 58 has an oblong slot 60 so arranged that the crank pin 53 will move the teeth 59 in one direction and its opposite, but will not move them at right angles thereto. These teeth move out and in through apertures 61 in the shell of the corrugated cylinder 50. By means of the clamp screw 56 the long crank pin 53 may be so adjusted that the teeth will be projected to their farthest extent when they are in the uppermost position, and may be withdrawn entirely within the cylinder shell when they are in the lower position, as shown in Fig. 8. Or the teeth may be adjusted to protrude farther before or after coming to the vertical position, with corresponding withdrawal at the position one hundred and eighty degrees therefrom. It will be seen that the teeth on each picker stem may be adjusted independently of the other picker stem. The teeth of the picker stems should never project beyond the outer edge of the corrugations, so that leaves, twigs, bolls, and other parts of the cotton plant or weeds growing therein, may not be caught by the teeth, while the fluffy cotton will press in between the corrugations and will engage in the teeth and the cotton will be dragged out of the bolls free from foreign matter. In order that the picker stems may pass nearly vertically through the cotton plant, yet at such an incline as to thoroughly pick the bush, the horizontal speed of the carrier is preferably made slightly less or slightly greater than the speed of the vehicle causing the picker stems to describe M or W shaped paths in the cotton plants, and effectually removing the fluffy cotton.

In order that branches of the cotton stalk lying longitudinally along the cotton row, may not press in between the corrugations and catch the teeth, I provide guards 70, having horns $70^a$, the said guards being over the picker stem and together with the said horns pressing the branches of the cotton stalk to one side or the other as the picker stem rises in the bush; as it descends in the bush, the same function is performed by the cups 71 which are suspended beneath the picker stem for the purpose of catching the cotton as it falls from the picker stem and for carrying it to the endless apron K upon which it is deposited. The link of the sprocket chain in which the shaft 32 is journaled, carries a downward projecting arm 74, fitted for a shaft 75, beneath which is suspended a cup 72, and an outer cup 71, the two being connected together by a flat spring 73, and both oscillating about the same pivots 75 and $75^a$ (see Fig. 4).

By having two troughs with a spring connection between the two, the jarring of the machine as it passes over the irregularities in the cotton field, such as clods, stones, &c., is to a large degree prevented from swaying the troughs about their axes, causing the cotton to be prematurely shaken out. The spring between the two gives a connection sufficiently yielding for this purpose, as also for inequalities of pressure in the downward descent of the troughs through the cotton stalks, and yet sufficiently firm for dumping the interior trough when the exterior is tripped, as will hereinafter be described. The outer end of these troughs or cups is supplied with a vertical projecting arm $74^a$ in which the outer end of the shaft 32 is pivoted. The troughs 71 and 72 thus move at all times beneath the picker stems, and the teeth of the picker stems are so set that they will drop the cotton into the said troughs. The said troughs are emptied on to the apron by the device shown in Fig. 6, where $12^a$ is a sleeve or collar on the shaft 12 and 76 is a boss on the trough 71. As the sprocket chain moves in the direction indicated by the arrow around the sprocket wheel 14, which is situated on the shaft 12, this boss 76 will strike the said collar $12^a$, tilting the trough 71 backward, and also the trough 72, connected by the spring 73 to the said trough 71, and emptying the cotton out on the apron K.

The operation of the machine is as follows: The machine is driven between the rows of cotton so that the picker stems will engage the branches on one side of the row, the said picker stems moving backward at nearly the same speed that the machine goes forward, will rise at a slight incline through the cotton branches pressing them gently to one side while the teeth will snatch the cotton out of the bolls; after passing upward on the front half of the machine, the picker stems will move at a similar gentle incline downward between the cotton branches thus going over the same plant twice, and effectually removing any cotton that passes within reach of the teeth. By having the teeth countersunk between the corrugations, leaves, twigs, &c., will lie flat on the edges of the revolving picker stems without catching in the teeth, to the mutual damage of the plant, and of the machine, while the fluffy cotton will be snatched out by the rapidly revolving teeth. The cotton will be deposited from the picker stems into the troughs dependent therefrom, and will be dumped out of these troughs on to the traveling apron in the manner already described; and the said apron will carry it into a bag or other receptacle L, which receptacle may be detached and thrown off at the end of the row, or may be placed in one of the boxes or receptacles F or F', which carry the empty receptacles. The box A' has a horn $a^3$ which will pass below the lowest lying branches, and will lift them up so as to engage the picker stem emerging from the said box. By having the height of the machine sufficient the picker stems may pass up and down through any height of cotton; but if desired two or more sizes of the machine may be constructed to gather from high or low cotton plants. The guard 70 will prevent the mutilation of the cotton plants or the injury to the teeth from longitudinal stems or branches.

It will be seen in my Patent No. 503,041, that the picker stems may be made to rise and descend in a vertical direction as well as at an incline in the cotton plant; and it will be obvious that the picker stems may be placed on either or both sides of the machine; and that many other modifications might be made which would readily suggest themselves to any one skilled in the art, and which could be used without departing from the spirit of my invention.

Having thus described my invention, what I claim, and desire to secure by Letters Patent of the United States, is—

1. In a picker stem for use in cotton harvesters, the combination with a hollow cylinder having corrugations on the exterior thereof, and apertures at the base of said corrugations, of a shaft journaled in the ends of said cylinder, cranks within said cylinder connected to said shaft, a crank pin extending through said cylinder, connecting said cranks, and picker teeth passing through said apertures in the cylinder, and having an enlarged slotted central portion engaging said crank pin, substantially as and for the purposes described.

2. In a picker stem for use in cotton harvesters, the combination with a hollow cylinder having corrugations on the exterior thereof, and apertures at the base of said corrugations, of a shaft journaled in the ends of said cylinder, cranks on the ends of said shaft, and means of setting said cranks at any desired angle relative to the ground, means for revolving said picker stems on said shaft, a crank pin and cranks connected to said shaft within said hollow cylinder, and picker teeth passing through said apertures in the cylinder, and having an enlarged slotted central portion engaging said crank pin, substantially as and for the purposes described.

3. In a picker stem for use in cotton harvesters, the combination with a hollow cylinder having corrugations on the exterior thereof, and apertures at the base of said corrugations, of a shaft journaled in the end of said cylinder, a device for clamping said shaft independent of said picker stem, a crank and a crank pin mounted on said shaft within said cylinder, double picker teeth provided with an enlarged slotted central portion engaging said crank pin, and projecting in the corrugations of either side of the cylinder, and a separate driving shaft rigidly attached to said picker stem, substantially as and for the purposes described.

4. In a picker stem for use in cotton harvesters, the combination with a hollow cylinder having corrugations on the exterior thereof, and apertures at the base of said corrugations, of a shaft journaled in the ends of said cylinder, cranks within said cylinder connected to said shaft, a crank pin extending through said cylinder connecting said cranks; picker teeth passing through said apertures in the cylinder, and having an enlarged slotted central portion engaging said crank pin and a rod extending over the axis of said picker stem to guard the teeth thereof, substantially as and for the purposes described.

5. In a picker stem for use in cotton harvesters, the combination with a hollow cylinder having corrugations on the exterior thereof, and apertures at the base of said corrugations, of a shaft journaled in the ends of said cylinder, cranks attached to the ends of said shaft, means of setting said cranks at any desired angle relative to the ground, means for revolving said picker stems on said shaft; a crank pin and cranks connected to said shaft within said hollow cylinder; picker teeth passing through said apertures in the cylinder, and having an enlarged slotted central portion engaging said crank pin; and a rod extending over the axis of said picker stem to guard the teeth thereof, substantially as and for the purposes described.

6. In a picker stem for use in cotton harvesters, the combination with a hollow cylinder having corrugations on the exterior thereof, and apertures at the base of said corrugations, of a shaft journaled in the end of said cylinder, a device for clamping said shaft independent of said picker stem, a crank and a crank pin mounted on said shaft within said cylinder, double picker teeth provided with an enlarged slotted central portion engaging said crank pin, and projecting in the corrugations of either side of the cylinder; a separate driving shaft rigidly attached to said picker stem, and a rod extending over the axis of said picker stem to guard the teeth thereof, substantially as and for the purposes described.

In testimony whereof I affix my signature in presence of two witnesses.

BENJAMIN GAUSE.

Witnesses:
W. McNAUGHT, Jr.,
W. M. SCOTT.